UNITED STATES PATENT OFFICE.

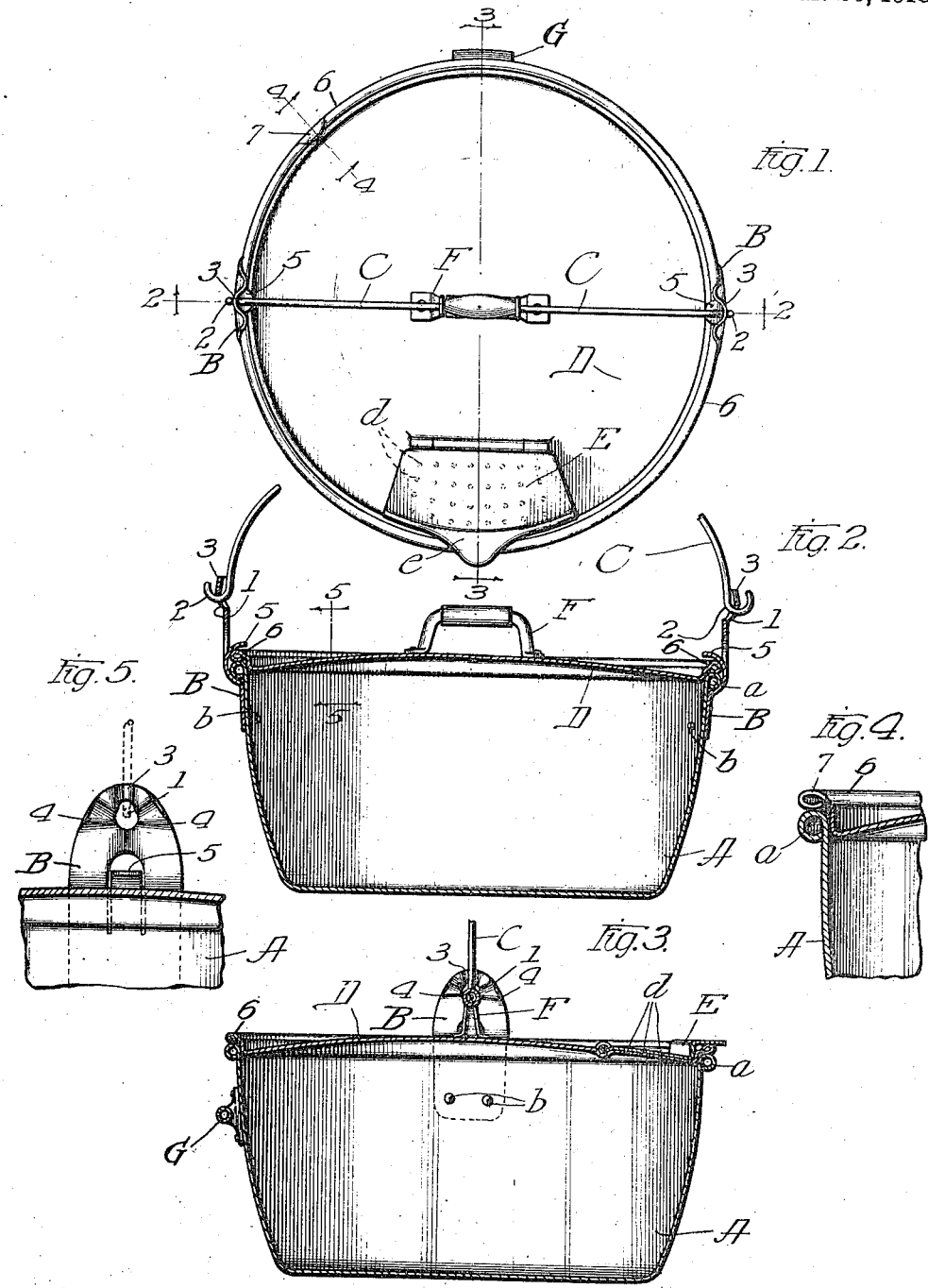

HERMAN A. PAQUETTE, OF CHICAGO, ILLINOIS, ASSIGNOR OF ONE-THIRD TO JOHN W. OLSON, OF CHICAGO, ILLINOIS, ONE-THIRD TO OTTO G. RYDEN, OF EVANSTON, ILLINOIS, AND ONE-THIRD TO IRA L. HARVEY, OF CHICAGO, ILLINOIS.

COOKING UTENSIL.

1,260,794. Specification of Letters Patent. Patented Mar. 26, 1918.

Application filed September 11, 1916. Serial No. 119,392.

*To all whom it may concern:*

Be it known that I, HERMAN A. PAQUETTE, a citizen of the United States of America, and resident of Chicago, Cook county, Illinois, have invented a certain new and useful Improvement in Cooking Utensils, of which the following is a specification.

My invention relates to cooking utensils of that kind in which the body, such as a kettle, is provided with a cover having a pouring device at one edge thereof, whereby the contents of the utensil can be poured off while the cover remains in position.

The object of my invention is to provide an improved construction and arrangement whereby said cover will be securely locked in place, so that the kettle may be turned partially upside down to pour off the contents, without danger of said cover falling off, thereby making a utensil of this kind much safer to handle.

It is also an object to provide certain details and features of construction and combinations tending to increase the general efficiency and serviceability of a cooking utensil of this particular character.

To the foregoing and other useful ends, my invention consists in matters hereinafter set forth and claimed.

In the accompanying drawings:—

Figure 1 is a plan of a kettle provided with a cover embodying the principles of my invention.

Fig. 2 is a vertical section on line 2—2 in Fig. 1.

Fig. 3 is a vertical section on line 3—3 in Fig. 1.

Fig. 4 is an enlarged detail section on line 4—4 in Fig. 1.

Fig. 5 is an enlarged detail sectional view on line 5—5 in Fig. 2.

As thus illustrated, my invention comprises a kettle-body A, of aluminum or other suitable metal, provided at each side with a bracket B secured thereto by rivets $b$, or in any other suitable manner. These brackets are provided with openings 1 for the hook-shaped end-portions 2 of the bail-shaped handle C, which latter may be of the usual form and character. Said brackets are provided with upper grooves 3 in which the bail engages to hold itself in upright position. Similar grooves 4 at the sides of the openings 1 will hold the bail in horizontal position at either side. These brackets B are preferably of sheet-metal having the requisite rigidity or stiffness, and are also formed in their upper portions with inturned lugs 5 which are formed by cutting out a portion of the metal and bending it inward, whereby these lugs 5 extend toward each other and overhang the rim $a$ of the kettle.

The cover D may be of any suitable character, but is preferably provided at one side thereof with a pouring device E consisting of holes or perforations $d$ in the cover and a hinged flap $e$ which prevents the steam from escaping while the cover is in horizontal position, but which swings outward when the kettle is turned partially upside down, thus allowing the liquid contents to be poured off without removing the cover from the kettle. The said cover, it will be seen, has an up-turned edge-portion 6 which rests upon the rim of the kettle, and which extends under the two lugs 5, whereby the cover is held down in place upon the rim of the kettle. Said cover is provided at one edge thereof with a notch 7 through which either lug 5 will pass when the cover is placed in position or removed. To insert the cover, it is only necessary to force one edge thereof under one of the lugs 5, and to then move the other edge of the cover downward, taking care that the other lug is exactly opposite said notch 7 in the edge of the cover. When the cover is properly seated, it can then be rotated by grasping its handle F, until the notch 7 is out of line with the lug, as shown in Fig. 1. In this way, the cover is held in place when the kettle is turned partially upside down, by means of lugs formed on the brackets or ears which connect the bail-shaped handle with the kettle. The said kettle has a place at one side for pouring off the contents, or at both sides, as the rim is circular, and when the cover is in position the pouring device E is exactly opposite the pouring place of the particular side-portion of the kettle from which the contents will be drained off when the kettle is tilted over to one side. The cover cannot slide off, inasmuch as it extends downward into the kettle a distance, as shown more clearly in Fig. 4, and is prevented from rising from this position by the lugs 5 at opposite sides of the kettle.

The receptacle can be tilted in any suitable manner, when raised by the handle C, but for convenience in so doing a handle G can be secured to the receptacle substantially midway between the lugs 5 and directly opposite the position occupied by the flap E when the cover is adjusted in place.

What I claim as my invention is:—

1. A cooking utensil comprising a receptacle having its rim provided with oppositely arranged and inwardly extending rigid lugs, each lug extending over the rim, a cover formed to extend upward and over said rim, with a single notch in the edge of said cover, and with the edge of the cover extending under said lugs, said cover having perforations therein a distance from said notch, a flap hinged on the cover to close said perforations, a handle for lifting said receptacle, and a handle for rotating said cover, said cover being removable by rotation to bring the single notch thereof under one of said lugs, and each lug being disposed at a point on the rim between said notch and said flap when the cover is in pouring position on the receptacle, handle-attaching portions extending above the tops of the lugs, so that each lug is integral with one of said portions, and said handle for the receptacle being pivoted in the upper ends of said handle-attaching portions, to permit the receptacle to be tilted.

2. The structure of claim 1, in which each lug and its said integral handle-attaching portion are provided by a bracket formed from a single blank having a hole to pivot the handle and a tongue bent inward below said hole to form the lug, and means to secure the two brackets to the receptacle.

Signed by me at Chicago, Illinois, this 25th day of August, 1916.

HERMAN A. PAQUETTE.

Copies of this patent may be obtained for five cents each, by addressing the "Commissioner of Patents, Washington, D. C."